(12) United States Patent
Wata et al.

(10) Patent No.: US 9,508,984 B2
(45) Date of Patent: Nov. 29, 2016

(54) COIN-TYPE LITHIUM SECONDARY BATTERY

(75) Inventors: Toshie Wata, Osaka (JP); Tadayoshi Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 955 days.

(21) Appl. No.: 13/578,966

(22) PCT Filed: Sep. 15, 2010

(86) PCT No.: PCT/JP2010/005632
§ 371 (c)(1),
(2), (4) Date: Aug. 14, 2012

(87) PCT Pub. No.: WO2011/101930
PCT Pub. Date: Aug. 25, 2011

(65) Prior Publication Data
US 2012/0315543 A1    Dec. 13, 2012

(30) Foreign Application Priority Data

Feb. 19, 2010 (JP) .................................. 2010-034462

(51) Int. Cl.
*H01M 4/38* (2006.01)
*H01M 4/505* (2010.01)
(Continued)

(52) U.S. Cl.
CPC ........... *H01M 4/134* (2013.01); *H01M 2/0222* (2013.01); *H01M 4/38* (2013.01); *H01M 4/386* (2013.01); *H01M 4/505* (2013.01); *H01M 4/621* (2013.01); *H01M 4/622* (2013.01);
(Continued)

(58) Field of Classification Search
None
See application file for complete search history.

(56) References Cited

U.S. PATENT DOCUMENTS 5,523,179 A * 6/1996 Chu .................. H01M 4/04
136/238
5,707,756 A * 1/1998 Inoue .................. H01M 2/1235
429/57

(Continued)

FOREIGN PATENT DOCUMENTS

CN 1897330 A 1/2007
JP 10-255768 A 9/1998
(Continued)

OTHER PUBLICATIONS

International Search Report issued in International Patent Application No. PCT/JP2010/005632 dated Dec. 7, 2010.
(Continued)

*Primary Examiner* — Barbara Gilliam
*Assistant Examiner* — Adam A Arciero
(74) *Attorney, Agent, or Firm* — McDermott Will & Emery LLP

(57) ABSTRACT

A coin-type lithium secondary battery includes a positive electrode, a negative electrode, a separator interposed between the positive electrode and the negative electrode, and a non-aqueous electrolyte. The negative electrode includes a negative electrode active material including a silicon alloy material, a conductive agent including a carbon material, and a binder. The silicon alloy material includes a phase A including a lithium-silicon alloy and a phase B including an intermetallic compound of a transition metal element and silicon. In the lithium-silicon alloy, a ratio of lithium atoms relative to silicon atoms is 2.75 to 3.65 in a 100% state-of-charge.

10 Claims, 1 Drawing Sheet

(51) Int. Cl.
    *H01M 4/42*    (2006.01)
    *H01M 4/62*    (2006.01)
    *H01M 4/40*    (2006.01)
    *H01M 4/44*    (2006.01)
    *H01M 4/134*   (2010.01)
    *H01M 2/02*    (2006.01)
    *H01M 10/052*  (2010.01)
    *H01M 10/0566* (2010.01)
    *H01M 10/0585* (2010.01)

(52) U.S. Cl.
    CPC ........... *H01M 4/623* (2013.01); *H01M 4/625* (2013.01); *H01M 10/052* (2013.01); *H01M 10/0566* (2013.01); *H01M 10/0585* (2013.01); *Y02E 60/122* (2013.01)

(56)         References Cited

U.S. PATENT DOCUMENTS

| | | |
|---|---|---|
| 6,235,427 B1 | 5/2001 | Idota et al. |
| 6,383,686 B1 | 5/2002 | Umeno et al. |
| 6,413,672 B1 | 7/2002 | Suzuki et al. |
| 2003/0039891 A1 | 2/2003 | Nitta et al. |
| 2006/0102472 A1 | 5/2006 | Bito et al. |
| 2006/0102473 A1 | 5/2006 | Bito et al. |
| 2007/0111099 A1* | 5/2007 | Nanjundaswamy .... H01M 4/06 429/231.95 |

FOREIGN PATENT DOCUMENTS

| | | |
|---|---|---|
| JP | 2000-003727 A | 1/2000 |
| JP | 2000-173596 A | 6/2000 |
| JP | 2000-215887 A | 8/2000 |
| JP | 2001-291512 A | 10/2001 |
| JP | 2004-228030 A | 8/2004 |
| JP | 2005-063805 A | 3/2005 |
| JP | 2005-317309 A | 11/2005 |

OTHER PUBLICATIONS

Chinese Office Action issued in Chinese Application No. 201080063839.X dated Apr. 23, 2014.

* cited by examiner

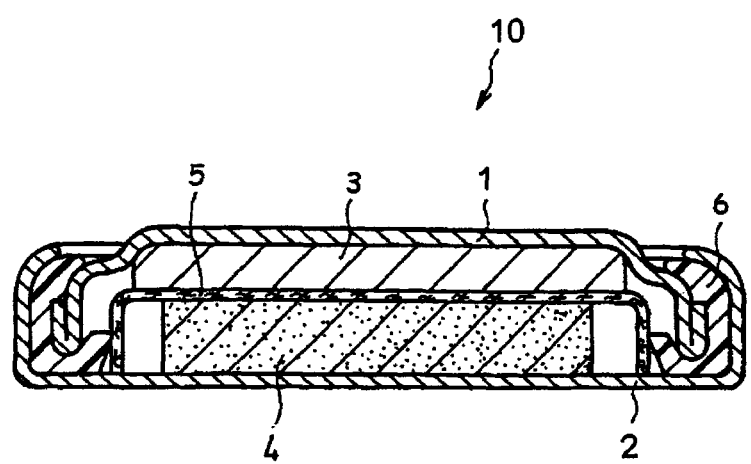

COIN-TYPE LITHIUM SECONDARY BATTERY

RELATED APPLICATIONS

This application is the U.S. National Phase under 35 U.S.C. §371 of International Application No. PCT/JP2010/005632, filed on Sep. 15, 2010, which in turn claims the benefit of Japanese Application No. 2010-034462, filed on Feb. 19, 2010, the disclosures of which Applications are incorporated by reference herein.

TECHNICAL FIELD

The present invention relates to a coin-type lithium secondary battery, and specifically relates to an improvement of a negative electrode active material used in the coin-type lithium secondary battery.

BACKGROUND ART

Lithium secondary batteries are widely used as main power sources or memory backup power sources of various electronic devices. In particular, in recent years, demand for lithium secondary batteries has been increasing as the use of small portable devices such as cellular phones and digital still cameras has been increasing.

While devices have been made small and lightweight, they are required to have higher functions, and memory capacity of the devices tends to increase. Therefore, both the main power sources and the backup power sources are required to be small and have high capacity. In recent years, studies have been made to use materials having high energy density as active materials for battery reaction.

In particular, silicon (Si) can be alloyed with lithium to composition of $Li_{4.4}Si$, and it has a theoretical capacity as large as 4,199 mAh/g. Therefore, by using silicon as the negative electrode active material, a battery having a high capacity can be obtained.

However, a negative electrode including a negative electrode active material having a high energy density as Si swells and shrinks significantly while it absorbs and desorbs lithium and tends to collapse. Also, the more the amount of lithium contributing to the reaction is, the more the charge and discharge cycle characteristics lower. Therefore, various propositions have been made to suppress deterioration of the active material and to obtain good charge and discharge cycle characteristics.

For example, Patent Literature 1 discloses to combine a positive electrode using a lithium-containing manganese oxide and a negative electrode using a negative electrode active material including an Si phase alloyed with lithium and an alloy phase of Si and a transition metal element. Patent Literature 1 proposes to reduce the change of shapes of the electrodes by controlling the range of x in $Li_xSi$ to $0 \leq x \leq 2.33$ during the charge and discharge, thereby to improve the charge and discharge cycle characteristics.

Meanwhile, coin-type lithium secondary batteries are often used as backup power sources. In such uses, in many cases, a voltage to some extent is applied to the batteries at all times and the batteries are maintained in a charged state. In general, if a charged state is maintained for a long time, the capacity retention rate of the batteries lowers significantly. However, in the use of backup power sources, it is necessary to ensure sufficiently the capacity retention rate (continuous charge characteristics) even after being subjected continuously to the charged state.

Thus, in the coin-type lithium secondary batteries, it is necessary to have high charge and discharge cycle characteristic together with high continuous charge characteristics, and it is necessary to carry out optimal battery design on the whole.

CITATION LIST

Patent Literature

[PTL 1] Japanese Laid-Open Patent Publication No. 2004-228030

SUMMARY OF INVENTION

Technical Problem

It is possible to obtain a high energy density by using a negative electrode active material including Si. However, in order to suppress deterioration of the negative electrode active material and improve the charge and discharge cycle characteristics, it is necessary to reduce an amount of Li absorbed in Si as disclosed in Patent Literature 1. However, if the amount of Li absorbed is reduced, the capacity lowers significantly in the initial state and during continuous charge, particularly when a conductive agent comprising a carbon material is combined with the negative electrode active material.

In $Li_xSi$, the potential of the negative electrode versus metallic Li changes from 0 to 3.0 V depending on the value x, and when the value x decreases, the potential of the negative electrode rises. When the conductive agent including a carbon material is combined with $Li_xSi$ in which the value x is small, a side reaction which involves the conductive agent, Li, and the non-aqueous electrolyte is likely to occur. In other words, as in Patent Literature 1, when the value x is small, the potential of the negative electrode during the charge does not lower sufficiently, and Li is consumed in the side reaction. Consequently, the proportion of Li contributing to the battery reaction (i.e. initial charge and discharge efficiency) decreases significantly.

Also, when the battery is subjected continuously to a charged state, the potential of the negative electrode during the charge is maintained high corresponding to the range of the value x, Li is consumed continuously by the side reaction. Thus, the continuous charge characteristics lower greatly.

Solution to Problem

The present invention aims to provide a coin-type lithium secondary battery having a high capacity and exhibiting excellent charge and discharge cycle characteristics and continuous charge characteristics.

An aspect of the present invention relates to a coin-type lithium secondary battery comprising: a positive electrode; a negative electrode; a separator disposed between the positive electrode and the negative electrode; and a non-aqueous electrolyte, the negative electrode including a negative electrode active material including a silicon alloy material, a conductive agent comprising a carbon material, and a binder, the silicon alloy material including a phase A comprising a lithium-silicon alloy and a phase B comprising an intermetallic compound of a transition metal element and silicon, and a ratio of lithium atoms relative to silicon atoms in the lithium-silicon alloy being 2.75 to 3.65 in a 100% state-of-charge.

While the novel features of the invention are set forth particularly in the appended claims, the invention, both as to organization and content, will be better understood and appreciated, along with other objects and features thereof, from the following detailed description taken in conjunction with the drawings.

Advantageous Effects of Invention

According to the present invention, a coin-type lithium secondary battery having excellent charge and discharge cycle characteristics and continuous charge characteristics can be provided. Also, the secondary battery in accordance with the present invention can improve the initial charge and discharge efficiency.

BRIEF DESCRIPTION OF DRAWING

FIG. 1 A schematic sectional view of a coin-type lithium secondary battery as an example of an embodiment of the present invention.

DESCRIPTION OF EMBODIMENT

A coin-type lithium secondary battery in accordance with the present invention includes a positive electrode, a negative electrode, a separator disposed between the positive electrode and the negative electrode, and a non-aqueous electrolyte.
(Negative Electrode)
The negative electrode includes a negative electrode active material including a silicon alloy material, a conductive agent comprising a carbon material, and a binder.

The silicon alloy material as the negative electrode active material includes a phase A comprising a lithium-silicon alloy and a phase B comprising an intermetallic compound of a transition metal element and silicon.

The lithium-silicon alloy constituting the phase A is represented by a composition formula $Li_xSi$. x is a ratio of lithium atoms relative to silicon atoms. In the present invention, the value x at the time when the battery is in a 100% state-of-charge (SOC) (e.g. initial state) is controlled to 2.75 to 3.65. The value x is preferably 2.8 to 3.6, more preferably 2.9 to 3.6.

By controlling the value x within such a range, the potential of the negative electrode can be lowered to a potential that is advantageous in the battery reaction. In such a potential, since most of Li is not consumed in the reaction with the conductive agent and the non-aqueous electrolyte and is absorbed in Si in the negative electrode active material, the negative electrode itself can be made to have a high density, and at the same time, the initial charge and discharge efficiency can be improved greatly. Also, since the value x is controlled within the above range, the potential of the negative electrode is maintained at a low level even when subjected continuously to the charged state, and the side reaction causing consumption of Li and decomposition of the non-aqueous electrolyte can be suppressed effectively. Consequently, both the charge and discharge cycle characteristics and the continuous charge characteristics can be improved.

When the value x is smaller than 2.75, the effect of improving the battery capacity by using Si is not satisfactory, and the proportion of the side reaction increases, thereby lowering the continuous charge characteristics. In particular, in the range where the potential of the negative electrode is as high as 0.3 to 0.8 V, the side reaction in which the conductive agent, Li, and the non-aqueous electrolyte participate is striking.

Meanwhile, when the value x is larger than 3.65, in the case where the charge and discharge are repeated, a part of lithium is deposited as metallic lithium when subjected continuously to the charged state. By the reaction of metallic lithium with the non-aqueous electrolyte, the non-aqueous electrolyte is decomposed and gas is produced. Consequently, the negative electrode capacity lowers.

Examples of the transition metal element constituting the intermetallic compound of the phase B include: Group 4 elements of the periodic table such as Ti and Zr; Group 6 elements such as Cr, Mo, and W; Group 7 elements such as Mn; Group 8 elements such as Fe; Group 9 elements such as Co; Group 10 elements such as Ni; and Group 11 elements such as Cu. The intermetallic compound may include one transition metal element, or a combination of two or more thereof. Among these, transition metal elements providing intermetallic compounds that are not likely to alloy with lithium such as Ti, Fe, Co, Ni, and Cu (particularly Ti) are preferable. As the intermetallic compound including Si and Ti, $TiSi_2$ is preferable.

In the case where the intermetallic compound is not likely to alloy with Li, even when the phase A absorbs Li and swells, the stress by the swelling can be relaxed effectively by the phase B. In the present invention, since the battery is charged until the value x becomes high and the phase A tends to swell greatly, it is advantageous to use the intermetallic compound that is not likely to alloy with Li.

In the silicon alloy material, the ratio of the transition metal element relative to the Si atoms (atom ratio) is, for example, 0.1 to 0.6, preferably 0.11 to 0.55, more preferably 0.13 to 0.44.

The average particle diameter (median diameter on basis of volume) of the negative electrode active material is, for example, 2 to 50 µm, preferably 3 to 40 µm, more preferably 4 to 30 µm. If the average particle diameter is too small, the reaction of lithium with the non-aqueous electrolyte is likely to occur because the reaction area is large, and the amount of lithium that can contribute to the charge and discharge may decrease. If the average particle diameter of the negative electrode active material is too large, the diffusion speed of Li becomes slow and improvement in the capacity may become difficult.

The silicon alloy material including the phase A and the phase B may be produced by a conventional method, for example, by alloying Li with an alloy including a transition metal element and Si. The alloy including a transition metal element and Si usually includes an Si phase, a phase of an intermetallic compound of a transition metal element and Si etc. When such an alloy is alloyed with Li, mainly the Si phase is alloyed with Li to be transformed into a lithium-silicon alloy phase (phase A).

The alloy including a transition metal element and Si is not particularly limited and can be produced by a conventional method, for example, a mechanical alloying method, a vacuum deposition method, a plating method, a chemical vapor deposition method, a liquid quenching method, an ion beam sputtering method etc.

The Si phase may be alloyed by forming a negative electrode (or negative electrode precursor) by using an alloy including a transition metal element and Si (negative electrode active material precursor), a conductive agent, and a binder, and subsequently adhering metallic lithium etc. to the obtained negative electrode, immersing the same in the non-aqueous electrolyte to cause a short circuit electrochemically. The metallic lithium that is made in contact with the negative electrode is usually in a sheet form such as lithium foil.

Since Li is also absorbed in the carbon material as the conductive agent when Si is alloyed with Li, Li that is to participate in the battery reaction (effective Li) is consumed in the side reaction with the conductive agent, and decomposition of the non-aqueous electrolyte is likely to occur. Consequently, the capacity of the negative electrode itself decreases and the internal resistance tends to increase.

In order to avoid such inconveniences, it is preferable that the Si phase is alloyed when the battery is assembled. If Li is alloyed with Si when the battery is assembled, the alloying reaction of Li and Si advances in a short time. Therefore, the side reaction of the conductive agent with Li can be suppressed, and the capacity decrease and the resistance increase of the negative electrode itself can be suppressed.

Examples of the carbon material used in the conductive agent include graphite (natural graphite, artificial graphite etc.), carbon black, and carbon fiber. The carbon material can be used singly or in combination of two or more. Graphite is more preferably used in view of low bulk and high conductivity.

By using such a conductive agent, the conductivity in the negative electrode can be maintained even when the negative electrode swells by absorbing Li, and the influence of the consumption of the effective Li due to the side reaction of the conductive agent and Li can be reduced. Therefore, the energy density of the negative electrode can be increased, and favorable charge and discharge cycle characteristics and continuous charge characteristics can be obtained.

The ratio of the conductive agent can be selected from the range of, for example, about 15 to 45 parts by weight, preferably 18 to 42 parts by weight, more preferably 20 to 40 parts by weight relative to 100 parts by weight of the negative electrode active material.

If the ratio of the conductive agent is too small, the buffer material-like effect that relaxes the swelling of the lithium-silicon alloy phase caused by absorption of Li decreases, and Si is pulverized partly, thus causing deterioration of the current collecting performance. As a result, the charge and discharge cycle characteristics and the continuous charge characteristics may lower.

If the ratio of the conductive agent is too large, the ratio of the negative electrode active material in the negative electrode decreases, and the battery capacity may be reduced. Also, the side reaction of the conductive agent and Li becomes non-negligible and the initial charge and discharge efficiency lowers, and the charge and discharge cycle characteristics and the capacity when subjected continuously to the charged state may decrease.

Examples of the binder include polyolefins such as polyethylene and polypropylene; fluorocarbon resins such as polytetrafluoroethylene (PTFE), polyvinylidene fluoride (PVDF), tetrafluoroethylene-hexafluoropropylene copolymers and modified products thereof; rubber-like polymers such as styrene-butadiene rubbers (SBR) and modified acrylonitrile rubbers; and acrylic polymers or salts thereof.

In view of high binding properties, the preferable binder is a polymer including at least one selected from acrylic acid and methacrylic acid as a monomer unit or a salt thereof. Specific examples thereof include: polyacrylic acid; polymethacrylic acid; acrylic acid-methacrylic acid copolymer; a copolymer of acrylic acid and/or methacrylic acid and another copolymerizable monomer (an olefin, an acrylic acid ester, a methacrylic acid ester, etc.), such as ethylene-acrylic acid copolymer and acrylic acid-methyl acrylate copolymer; and a salt thereof. Polyacrylic acid is particularly preferable.

The binder may be used singly or in combination of two or more. The binder may be used in the form of dispersion dispersed in a dispersing medium.

The ratio of the binder is, for example, 1 to 20 parts by weight, preferably 5 to 15 parts by weight relative to 100 parts by weight of the negative electrode active material.

The negative electrode should include a negative electrode active material, a conductive agent, and a binder, and may be formed by applying a material mixture including these components onto a surface of a sheet-like negative electrode current collector (copper, stainless steel etc.). In a preferred mode, the negative electrode is formed singly of a material mixture and can be produced, for example, by molding a negative electrode material mixture including the above components into a sheet form or a disk form. At the time of assembling the battery, in the case where the negative electrode active material is produced by alloying lithium with an alloy including a transition metal element and Si (negative electrode active material precursor), the negative electrode precursor is formed of a material mixture including a negative electrode active material precursor, a conductive agent, and a binder. The material mixture may be dried by natural drying or by heating under a reduced pressure or an atmospheric pressure.

A dispersing medium may be used in the negative electrode active material as necessary. The dispersing medium is not particularly limited, and examples thereof include water, alcohols such as ethanol, ether such as tetrahydrofuran, amides such as dimethyl formamide, N-methyl-2-pyrrolidone, and mixed solvents thereof.

(Positive Electrode)

The positive electrode includes a positive electrode active material and usually further includes a binder. The positive electrode active material is not particularly limited as long as it can absorb and desorb Li, and a conventional active material such as a transition metal oxide and a conductive polymer such as polyacene can be used. Specific examples of the transition metal oxide include $V_2O_5$, $V_6O_{13}$, $WO_3$, $Nb_2O_5$, $MnO_2$, a composite oxide including lithium and a transition metal element (manganese, cobalt, nickel, and/or titanium etc.). Examples of the composite oxide including lithium and a transition metal element include $LiMnO_2$, $LiMn_2O_4$, $Li_4Mn_5O_{12}$, $Li\ Mn_4O_9$, $LiCoO_2$, $LiNiO_2$, and $Li_{4/3}Ti_{5/3}O_4$. Among these, composite oxides including lithium and manganese are preferable. The positive electrode active material can be used singly or in combination of two or more.

As the binder, the same binder as those indicated as the binder of the negative electrode can be used.

The positive electrode may further include a conductive agent. The conductive agent is not particularly limited as long as it is an electron conductor that does not cause chemical reactions in the use potential range at the time of charge and discharge of the battery. In addition to the same carbon materials as those indicated as the conductive agent of the negative electrode, metal powder and metal fiber etc. can be used. The conductive agent can be used singly or in combination of two or more.

The positive electrode should include a positive electrode active material and can be formed by applying a material mixture including a positive electrode active material, a binder, and a conductive agent as necessary onto a surface of a sheet-like positive electrode current collector (aluminum, aluminum alloy etc.). In a preferred mode, the positive electrode is formed of the material mixture only in the same manner as the negative electrode. The positive electrode can be produced according to the production method of the negative electrode.

(Separator)

Examples of the separator include woven or nonwoven cloth, and microporous film made of a polyolefin. Examples of the resin forming the woven or nonwoven cloth include polyolefins such as polypropylene; polyphenylene sulfides; aromatic polyesters such as aramid; polyimide resins such as polyimide and polyamide imide; and polyether ether ketones. The woven or nonwoven cloth may include one of these resins singly or in combination of two or more. Examples of the polyolefin included in the microporous film include polyethylene, polypropylene, and ethylene-propylene copolymer.

The thickness of the separator can be selected appropriately from the range of about 10 to 250 µm, for example.

(Non-Aqueous Electrolyte)

The non-aqueous electrolyte includes a non-aqueous solvent and a lithium salt dissolved in the non-aqueous solvent. The kinds of the non-aqueous solvent and the lithium salt are not particularly limited and those known or used conventionally can be used.

Examples of the non-aqueous solvent include cyclic carbonates such as ethylene carbonate (EC), vinylethylene carbonate, propylene carbonate (PC), and butylene carbonate; chain carbonates such as dimethyl carbonate, diethyl carbonate, and ethyl methyl carbonate; cyclic ether such as 1,4-dioxane, 1,3-dioxolane, 2-methyl tetrahydrofuran, and 3-methyl tetrahydrofuran; chain ether such as 1,2-dimethoxyethane (DME), 1,2-diethoxyethane, 1,3-dimethoxypropane, diethylene glycol dimethyl ether, and tetraglyme; lactones such as γ-butyrolactone; and sulfoxide compounds such as sulfolane. The non-aqueous solvent can be used singly or in combination of two or more.

Examples of the lithium salt include lithium salts of fluorine-containing acid imide [$LiN(CF_3SO_2)_2$, $LiN(C_2F_5SO_2)_2$, $LiN(CF_3SO_2)(C_4F_4SO_2)$ etc.], lithium salts of fluorine-containing acid ($LiPF_6$, $LiBF_4$, $LiCF_3SO_3$ etc.), and lithium salts of chloride-containing acid ($LiClO_4$ etc.) The lithium salt can be used singly or in combination of two or more. The concentration of the lithium salt in the non-aqueous electrolyte is 0.5 to 2 mol/L, for example.

The non-aqueous electrolyte may be a solution in which the lithium salt is dissolved in the non-aqueous solvent or may be a gel in which this solution is retained in a polymeric material. Examples of the polymeric material include fluorocarbon resins such as polyvinylidene fluoride and vinylidene fluoride-hexafluoropropylene copolymer; chloride-containing vinyl resins such as polyvinyl chloride; vinyl cyanide resins such as polyacrylonitrile; acrylic resins such as polyacrylate; and polyalkylene oxides such as polyethylene oxide. These polymeric materials may be used singly or in combination of two or more.

The coin-type lithium secondary battery in accordance with the present invention can be produced, for example, by housing the positive electrode, the negative electrode, the separator disposed therebetween, and the non-aqueous electrolyte in a battery case and sealing it with a sealing plate. The production method is not particularly limited and a known method, for example, the following method can be employed. That is, the positive electrode is placed in the battery case (on inner bottom surface etc.), the separator is placed on the positive electrode, and the non-aqueous electrolyte is housed therein. Next, the sealing plate is fitted into an opening of the battery case with a gasket therebetween in such a state that the negative electrode is adhered onto an inner surface of the sealing plate to seal the battery case, thereby producing the coin-type lithium secondary battery.

In the present invention, the value x at the time when the battery is in the 100% state-of-charge is controlled to 2.75 to 3.65, as described above. Therefore, the coin-type lithium secondary battery in which the positive electrode uses a lithium- and manganese-containing composite oxide suited for 3 V batteries, is particularly useful when the charge cutoff voltage is set to 3.3 V or less. The charge cutoff voltage is preferably set within the range of 2.8 to 3.3 V. Corresponding to the positive electrode active material used, the charge and discharge range of the coin-type lithium secondary battery is selected such that the value x satisfies the above range.

FIG. 1 is a schematic sectional view of a coin-type lithium secondary battery as an example of an embodiment of the present invention.

A coin-type lithium secondary battery 10 includes a disk-shaped positive electrode 4, a disk-shaped negative electrode 3, a separator 5 interposed between the positive electrode 4 and the negative electrode 3, and a non-aqueous electrolyte that is not illustrated in the figure. The positive electrode 4 includes a positive electrode active material, a conductive agent, and a binder. The negative electrode 3 includes a negative electrode active material including a phase A comprising a lithium-silicon alloy and a phase B comprising an intermetallic compound of a transition metal element and silicon, a conductive agent comprising a carbon material, and a binder.

The separator 5 is nonwoven resin cloth or microporous film perforated circularly. The positive electrode 4 and the negative electrode 3 are housed in a battery case 2 made of stainless steel in such a state that the positive electrode 4 and the negative electrode 3 are insulated from each other by the separator 5 and that the positive electrode 4 is in contact with an inner bottom surface of the battery case 2.

In the battery case 2, a gasket 6 made of resin (made of polypropylene etc.) that is injection molded into a ring shape is disposed from an opening to an inner wall. An opening upper end of the battery case 2 is bent inward by crimping in such a state that the gasket 6 is disposed between the opening upper end and a sealing plate 1 made of stainless steel.

The negative electrode 3 is produced by alloying lithium with a disk-shaped negative electrode precursor including an alloy containing a transition metal element and Si (negative electrode active material precursor), a conductive agent, and a binder at the time of assembling the battery 10. Specifically, the negative electrode precursor to which lithium foil is adhered and the positive electrode 4 are housed in the battery case 2 with the separator 5 disposed therebetween, and subsequently the non-aqueous electrolyte is injected therein. Thus, the negative electrode precursor to which the lithium foil is adhered is immersed in the non-aqueous electrolyte to be short-circuited electrochemically, thereby producing the negative electrode 3. Herein, the metallic lithium (lithium foil) is used in such an amount that the value x in $Li_xSi$ of the phase A in the negative electrode 3 is 2.75 to 3.65. When the lithium foil is used, the amount of metallic lithium used can be adjusted by adjusting the thickness and/or the area of the foil.

Example (1) Consideration of Composition Ratio of Lithium Relative to Si (Production of Negative Electrode)

A Ti—Si alloy was prepared by a mechanical alloying method. At that time, Ti and Si were introduced into a vibration ball mill apparatus in a mass ratio of 36:64, and further, a ball made of stainless steel having a diameter of 15 mm was introduced thereto. The inside of the apparatus was replaced with argon and maintained at 1 atmospheric pressure. Under these conditions, a mechanical alloying operation was performed. The vibration ball mill apparatus was driven under the conditions of an amplitude of 8 mm and a rotation frequency of 1,200 rpm and the mechanical alloying was performed for 80 hours, thereby obtaining an alloy powder having an average particle diameter of 10 µm.

As the binder, an aqueous solution of non-crosslinked type polyacrylic acid having a weight-average molecular weight of 150,000 (available from Wako Pure Chemical Industries, Ltd.) was used. As the conductive agent, graphite having an average particle diameter of 10 µm (available from Nippon Graphite Co., Ltd.) was used.

The Ti—Si alloy, the graphite as the conductive agent, and the polyacrylic acid as the binder were mixed in a mass ratio of solids of 100:30:10 to prepare a paste. The obtained paste was molded into a circular pellet form having a diameter of 4.0 mm and a thickness of 0.38 mm, dried at 160° C. for 12 hours, and used as the negative electrode precursor.

(Production of Positive Electrode)

As the positive electrode active material, lithium manganate obtained by mixing manganese dioxide and lithium hydroxide in a molar ratio of 2:1 and baking the mixture at 400° C. for 12 hours was used. This positive electrode active material, acetylene black as the conductive agent, and an aqueous dispersion of a fluorinated resin as the binder were mixed in a mass ratio of solids of 100:5:8 to prepare a paste. The obtained paste was pressure-molded into a circular pellet from having a diameter of 4.1 mm and a thickness of 1.2 mm and dried at 250° C. for 10 hours, thereby to produce the positive electrode.

(Preparation of Non-Aqueous Electrolyte)

The non-aqueous electrolyte was prepared by dissolving a lithium salt $LiN(CF_3SO_2)_2$ in a mixed solvent of PC:EC:DME=1:1:1 (volume ratio) as the non-aqueous solvent. The concentration of the lithium salt was 1 mol/L.

As the separator, nonwoven cloth of polypropylene was used. Also, a gasket made of polypropylene was used.

A coin-type lithium secondary battery as illustrated in FIG. 1 was produced according to the aforementioned method.

In the assembly of the battery, metallic lithium foil was adhered to a surface of the negative electrode precursor and immersed in the non-aqueous electrolyte to be electrochemically short-circuited, thereby to alloy lithium with Si in the precursor. The size and thickness of the lithium foil was determined such that the ratio x of lithium in $Li_xSi$ included in the negative electrode was 3.0.

The outside dimension of the battery was an outer diameter of 6.8 mm and a height of 2.1 mm. The battery produced by the above production process was designated as a battery A1.

Batteries A2 to A7 were produced in the same manner as the battery A1 except that the metallic lithium foil whose size and thickness were adjusted was adhered to the negative electrode 3 to alloy lithium with Si such that the ratio x of lithium was the values shown in Table 1.

(Initial Charge and Discharge Efficiency)

A week after the assembly, five batteries each of the above batteries A1 to A7 were discharged to a battery voltage of 0 V with resistance of 20 kΩ in an environment of 20° C., a ratio of the amount of lithium desorbed by the discharge relative to the amount of lithium absorbed (initial charge and discharge efficiency) was confirmed, and each average value thereof was calculated.

(Charge and Discharge Cycle Characteristics)

A week after the assembly, five batteries each of the batteries A1 to A7 were repeatedly charged and discharged in an environment of 20° C. under the following conditions. While the capacity at the first cycle was defined as 100, an average value of the capacity after repeating 100 cycles of charge and discharge was calculated respectively and defined as a capacity retention rate.

Charge: charge with resistance of 2 kΩ at a constant voltage of 3.2 V for 60 hours Discharge: discharge with resistance of 20 kΩ to charge cutoff voltage of 2.0 V (Continuous Charge Characteristics)

In order to evaluate continuous charge characteristics, continuous charge was performed at 3.2 V in an environment of 60° C. and a capacity residual rate after 20 days was measured in the following manner.

A week after the assembly, five batteries each of the batteries A1 to A7 were first charged at a constant voltage of 3.2 V in an environment of 20° C. with resistance of 2 kΩ, then discharged to 2.0 V with resistance of 20 kΩ, and the initial capacity was measured. Subsequently, a voltage of 3.2 V was applied continuously in an environment of 60° C. After 20 days, the batteries were discharged to a battery voltage of 2.0 V in an environment of 20° C. with resistance of 20 kΩ, and the residual capacity was measured. An average value of a ratio of the residual capacity relative to the initial capacity was calculated respectively and defined as a capacity residual rate.

Table 1 shows ratio x of lithium in $Li_xSi$, initial charge and discharge efficiency, capacity retention rate after 100 cycles of charge and discharge were repeated (charge and discharge cycle characteristics), and capacity residual rate after continuous charge (continuous charge characteristics).

TABLE 1

|  | X (Li/Si) | Initial charge and discharge efficiency (%) | Charge and discharge cycle characteristics (%) | Continuous charge characteristics (%) |
| --- | --- | --- | --- | --- |
| Battery A2 | 2.3 | 30 | 92 | 50 |
| Battery A3 | 2.7 | 51 | 91 | 61 |
| Battery A4 | 2.8 | 83 | 90 | 94 |
| Battery A1 | 3.0 | 83 | 92 | 94 |
| Battery A5 | 3.6 | 84 | 90 | 95 |
| Battery A6 | 3.7 | 83 | 65 | 76 |
| Battery A7 | 4.0 | 83 | 40 | 70 |

As shown in Table 1, it was found that, in the batteries A1, A4 and A5 of Examples in which the ratio x of the lithium atoms relative to the Si atoms was in a specific range, initial charge and discharge efficiency was high, and favorable charge and discharge cycle characteristics and continuous charge characteristics were obtained.

As in the batteries A2 and A3, when x is too small, the initial charge and discharge efficiency lowers significantly, and the continuous charge characteristics lower as well.

The reason for the decline of the initial charge and discharge efficiency is considered that most of lithium is consumed in the reaction with the conductive agent or in the decomposition reaction of the non-aqueous electrolyte when lithium is absorbed in the negative electrode.

Also, the reason for the decline of the continuous charge characteristics is considered that, since the potential of the negative electrode is maintained at a potential causing reaction of the conductive agent with lithium and decomposition reaction of the non-aqueous electrolyte when subjected continuously to the charged state, consumption reaction of lithium occurs continuously.

As in the batteries A6 and A7, when the ratio x of the lithium atoms relative to the Si atoms is too large, the charge and discharge cycle characteristics and the continuous charge characteristics lower. The reason for this is considered that, when the charge and discharge are repeated or the battery is subjected continuously to the charged state, metallic lithium is deposited partly, and decomposition of the non-aqueous electrolyte and gas production reaction caused by reaction of the metallic lithium with the non-aqueous electrolyte occur, thereby lowering the negative electrode capacity.

(2) Consideration of Amount of Conductive Agent Relative to Negative Electrode Active Material Next, batteries A8 to A13 were produced in the same manner as the battery A1 except that the used amount of the graphite as the conductive agent relative to 100 parts by weight of the negative electrode active material was changed to values shown in Table 2.

In the same manner as the above "(1) Consideration of composition ratio of lithium relative to Si", the initial charge and discharge efficiency, the charge and discharge cycle characteristics, and the continuous charge characteristics were evaluated with regard to five batteries each of the above batteries A8 to A13 and A1.

Table 2 shows results of evaluation together with the used amount of the conductive agent.

TABLE 2

|  | Conductive agent (parts by weight) | Initial charge and discharge efficiency (%) | Charge and discharge cycle characteristics (%) | Continuous charge characteristics (%) |
| --- | --- | --- | --- | --- |
| Battery A8 | 10 | 81 | 79 | 81 |
| Battery A9 | 15 | 80 | 86 | 86 |
| Battery A10 | 20 | 83 | 91 | 93 |
| Battery A1 | 30 | 83 | 92 | 94 |
| Battery A11 | 40 | 84 | 92 | 92 |
| Battery A12 | 45 | 78 | 85 | 85 |
| Battery A13 | 50 | 75 | 81 | 81 |

As shown in Table 2, it is found that the batteries A10, A1, and A11 in which the ratio of the conductive agent relative to the negative electrode active material is in a specific range have further improved initial charge and discharge efficiency, charge and discharge cycle characteristics, and continuous charge characteristics.

As in the batteries A8 and A9, when the proportion of the conductive agent is too small, the charge and discharge cycle characteristics and the continuous charge characteristics may lower. The reason for this is considered that the buffer material-like effect of the conductive agent that relaxes the swelling of Si when lithium is absorbed in the negative electrode lowers and Si is partly pulverized, thereby lowering the current-collecting performance.

In contrast, as in the batteries A12 and A13, when the proportion of the conductive agent is too large, the initial charge and discharge efficiency lowers, and the charge and discharge cycle characteristics as well as the capacity when subjected continuously to the charged state may lower significantly. The reason for this is considered that the ratio of the active material in the negative electrode lowers thereby decreasing the capacity, and the side reaction of the conductive agent increases.

Also, it is confirmed that the same results as above are obtained when the ratio x of the lithium atoms relative to the Si atoms is in a range of 2.75 to 3.65.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The coin-type lithium secondary battery in accordance with the present invention has a high capacity, excellent charge and discharge cycle characteristics, and excellent continuous charge characteristics. Therefore, it can be applied to various uses as the main power sources or backup power sources of small portable devices such as cellular phones and digital still cameras.

REFERENCE SIGNS LIST

1 sealing plate
2 battery case
3 negative electrode
4 positive electrode
5 separator
6 gasket
10 coin-type lithium secondary battery

The invention claimed is:

1. A coin-type lithium secondary battery comprising:
a positive electrode;
a negative electrode;
a separator interposed between the positive electrode and the negative electrode; and
a non-aqueous electrolyte,
the negative electrode including a negative electrode active material including a silicon alloy material, a conductive agent comprising a carbon material, and a binder,
the silicon alloy material including a phase A comprising a lithium-silicon alloy and a phase B comprising an intermetallic compound of a transition metal element and silicon, and
a ratio of lithium atoms relative to silicon atoms in the lithium-silicon alloy being 2.75 to 3.65 in a 100% state-of-charge, wherein:
the positive electrode includes a positive electrode active material and the positive electrode active material is a composite oxide including lithium and manganese, and
a charge cutoff voltage is set in a range of 2.8 to 3.3 V.

2. The coin-type lithium secondary battery in accordance with claim 1, wherein the ratio of the lithium atoms relative to the silicon atoms in the 100% state-of-charge is 2.8 to 3.6.

3. The coin-type lithium secondary battery in accordance with claim 1, wherein a ratio of the transition metal element relative to the silicon atoms in the silicon alloy material is 0.1 to 0.6.

4. The coin-type lithium secondary battery in accordance with claim 1, wherein the inter metallic compound is $TiSi_2$.

5. The coin-type lithium secondary battery in accordance with claim 1, wherein the negative electrode active material has an average particle diameter of 2 to 50 μm.

6. The coin-type lithium secondary battery in accordance with claim 1, wherein a ratio of the conductive agent is 18 to 42 parts by weight relative to 100 parts by weight of the negative electrode active material.

7. The coin-type lithium secondary battery in accordance with claim 1, wherein the ratio of the conductive agent is 20 to 40 parts by weight relative to 100 parts by weight of the negative electrode active material.

8. The coin-type lithium secondary battery in accordance with claim 1, wherein the conductive agent is graphite.

9. The coin-type lithium secondary battery in accordance with claim 1, wherein the binder is a polymer including at least one selected from acrylic acid and methacrylic acid as a monomer unit, or a salt thereof.

10. The coin-type lithium secondary battery in accordance with claim 1, wherein a ratio of the binder is 1 to 20 parts by weight relative to 100 parts by weight of the negative electrode active material.

* * * * *